UNITED STATES PATENT OFFICE.

AL IDE FRANCOIS POIRRIER AND DANIEL AUGUSTE ROSENSTIEHL, OF PARIS, FRANCE, ASSIGNORS TO THE SOCIÉTÉ ANONYME DES MATIERES COLORANTES ET PRODUITS CHIMIQUES DE ST. DENIS.

SULPHO-CONJUGATED VIOLETS OF PARIS.

SPECIFICATION forming part of Letters Patent No. 297,844, dated April 29, 1884.

Application filed January 17, 1884. (No specimens.)

*To all whom it may concern:*

Be it known that we, ALCIDE FRANCOIS POIRRIER and DANIEL AUGUSTE ROSENSTIEHL, both citizens of the French Republic, and residents of Paris, France, have invented certain new and useful Improvements in the Manufacture of the Coloring-Matter known as Sulpho-Conjugated Violets of Paris, which invention is fully set forth in the following specification.

This invention has for its object to overcome certain difficulties encountered in proceeding according to the mode heretofore adopted. In the manufacture of these sulpho-conjugated violets of Paris, sulphuric acid in excess is employed, which excess of acid it is necessary to eliminate by special operations.

Heretofore the plan ordinarily pursued has been to dilute with water the crude product of the reaction, to saturate with milk of lime, and to remove the sulphuric acid in the form of the slightly-soluble sulphate of lime, the coloring-acid or acid coloring-matter remaining in solution. This manner of operating requires the evaporation of a considerable quantity of liquids, and thence difficulties have resulted which until now have practically or to a great extent prevented the use of the sulpho-conjugated Paris violets. Such is the instability of the coloring-matter that during evaporation it is in part destroyed, and the portion which escapes destruction is injured by the products of the alteration. Moreover, the coloring-matter obtained in the form of powder is difficult of solution.

In the present invention the difficulties are avoided. The excess of sulphuric acid is not removed, but it is in whole or in part transformed into a soluble sulphate, such sulphate of potash, of soda, of ammonia, of magnesia, or of zinc, and to the resulting product is added only the amount of water strictly necessary to form a paste of suitable consistence. In this way the double advantage is obtained of avoiding alteration in the coloring-matter and of obtaining the same in a fine state of division, which renders its employment easy in consequence of the facility with which it dissolves.

We claim—

1. The improvement described in the manufacture of sulpho-conjugated Paris violets, consisting in treating the crude coloring-matter with potash, soda, ammonia, zinc, magnesia, or other suitable base, so as to transform the excess of acid into soluble sulphate.

2. The product of the described treatment, the same being a composition of sulpho-conjugated Paris violet, with the free acid neutralized by a suitable substance in the nature of those above specified and having the characteristics set forth.

In witness whereof we have hereunto signed our names in the presence of two subscribing witnesses.

ALCIDE FRANCOIS POIRRIER.
   DANIEL AUGUSTE ROSENSTIEHL.

Witnesses:
 ARMENGAUD, Jeune,
 ROBT. M. HOOPER.